United States Patent [19]
Howard

[11] Patent Number: 4,590,770
[45] Date of Patent: May 27, 1986

[54] CRYOGENIC LIQUID HEAT EXCHANGER

[75] Inventor: Norman A. Howard, Cupertino, Calif.

[73] Assignee: National Semiconductor Corporation, Santa Clara, Calif.

[21] Appl. No.: 740,709

[22] Filed: Jun. 3, 1985

[51] Int. Cl.[4] ............................................... F17C 7/02
[52] U.S. Cl. ............................................. 62/52; 165/74
[58] Field of Search ................ 62/52, 53; 165/74, 163

[56] References Cited

U.S. PATENT DOCUMENTS

| | | | |
|---|---|---|---|
| 2,067,720 | 1/1937 | McCombs et al. | 62/53 X |
| 2,252,830 | 8/1941 | Bliss et al. | 62/53 |
| 3,696,636 | 10/1972 | Mille | 62/52 X |
| 4,174,619 | 11/1979 | Tocha | 62/52 |

Primary Examiner—Stephen F. Husar
Attorney, Agent, or Firm—Gail W. Woodward; Paul J. Winters; Michael J. Pollock

[57] ABSTRACT

A heat exchanger for cryogenic liquid evaporation is shown. A coil of tubing is coupled to the source of cryogenic liquid and heated by the flow of water. The other end of the coil is the gas exit at about atmospheric pressure. The gas back pressure in the coil is employed to self regulate the flow of cryogenic liquid into the heat exchanger.

7 Claims, 2 Drawing Figures

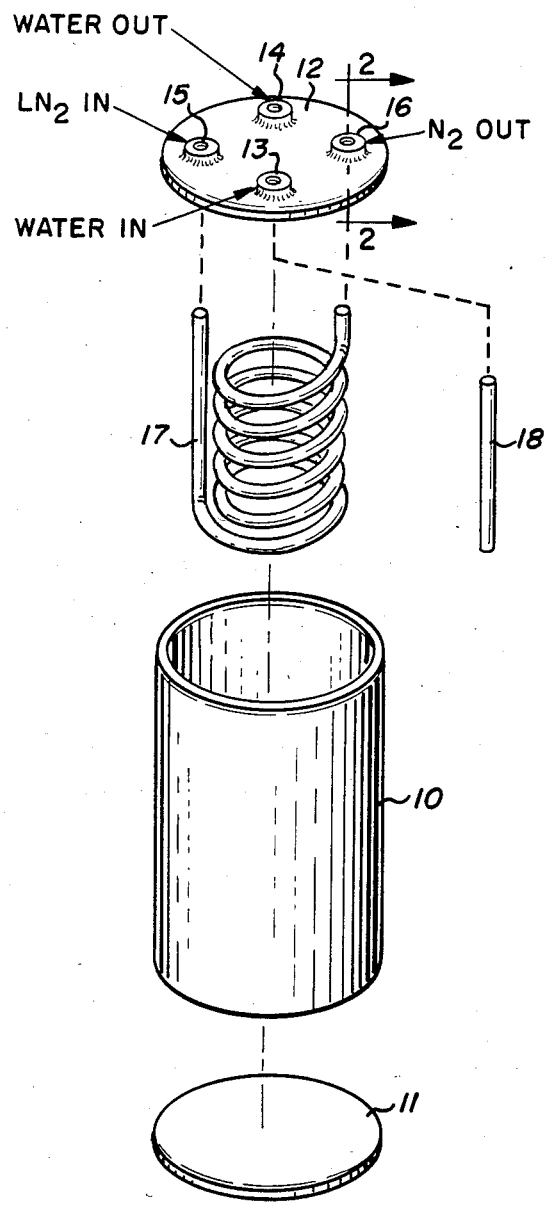
Fig_1
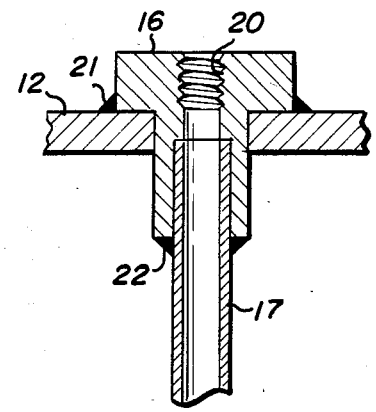
Fig_2

CRYOGENIC LIQUID HEAT EXCHANGER

BACKGROUND OF THE INVENTION

Cryogenic liquids are being used with increasing frequency in industrial processes. One commonly used cryogenic liquid is liquid nitrogen ($LN_2$) which boils at just above 77° K. at atmospheric pressure. This is about −196° C. Such liquids are difficult to dispose of once their primary cooling effect has been accomplished. If the excess $LN_2$ is simply dumped into the atmosphere it quickly freezes everything in its vicinity. Atmospheric water is condensed forthwith and quickly forms ice which appears as frost on the venting orifice. Such ice can easily block the vent and prevent further disposal. In any event, the resultant icing is difficult to cope with. Even if the ice is melted by some means the water thereby produced must be handled. One approach is to convert all of the $LN_2$ to gas, warm it, and vent it into the atmosphere. Alternatively, the gas can be recycled back into the system.

SUMMARY OF THE INVENTION

It is an object of the invention to provide a heat exchanger based upon water flow which can provide the heat necessary to convert a liquid cryogenic material into its gaseous state.

It is a further object of the invention to provide a self flow regulating heat exchanger in which a water flow supplies the heat required to gasify a cryogenic liquid.

These and other objects are achieved in a heat exchanger consisting of a coil of tubing immersed in a container that is provided with flowing water. The cryogenic liquid is supplied to one end of the coil whereupon it vaporizes and the gas flows through the coil which acts to produce a back pressure. This back pressure excludes the flow of input liquid. The cessation of flow reduces the gas generation so that the back pressure falls and once again permits the liquid flow. Thus, the system self regulates the liquid flow. The coil raises the gas flow temperature to where the gas can be vented into the atmosphere without producing water condensation or ice.

BRIEF DESCRIPTION OF THE DRAWING

FIG. 1 is an exploded view of the heat exchanger of the invention.

FIG. 2 is a cross section of the bushing employed in the connector portion of the FIG. 1 showing.

DESCRIPTION OF THE INVENTION

In the FIG. 1 showing a stainless steel (304 alloy) cannister, or housing chamber, is created by tubing section 10 to which is welded a closure plate 11. The other end is closed by welding plate 12 thereto. Plate 12 has four connector bushings secured therein at ports 13-16.

FIG. 2 shows the detail in cross section of the port connector fitting located at 16. The other ports 13-15 are of similar construction. Stainless steel bushing 16 is Heli-Arc welded to plate 12 at 21. Bushing 16 has a 6.35 mm threaded input 20. The other end of bushing 16 is counter bored to accommodate 9.5 mm tubing 17 which is silver brazed at 22.

Referring back to FIG. 1, a coil of tubing 17 is joined between ports 15 and 16. Port 13 is provided with a straight tubing section 18 which is made long enough to reach to the bottom of coil 17. In its preferred condition the cannister is located in its vertical upright position. A water input at port 13 will fill the cannister and exit at port 14 thus creating a vertically upward water flow.

Liquid nitrogen ($LN_2$) is introduced into port 15. Since $LN_2$ boils at about 77° K. at atmospheric pressure (about −196° C.), contact near port 15 with tubing 17, which is warmed by water at room temperature, will forthwith vaporize therey creating gaseous nitrogen ($N_2$). This gas will traverse tubing 17 and will be warmed in transit, to preferably above the atmospheric dew point, to exit at port 16. At this point the $N_2$, can simply be vented to the atmosphere or it can be recovered for use in some other system or recycled back into the cryogenic system.

The gas in tubing 17 will develop a back pressure. When the cryogenic liquid flows into port 15 it will encounter relatively hot tubing (well over 200° C. hotter) and will therefore quickly vaporize. This generates a large quantity of gas which will act to prevent the further input of liquid. It is noted that one liter of $LN_2$ will produce well over 1600 liters of $N_2$. Once the flow of $LN_2$ is halted the exit of gas at port 16 will lower the back pressure and once again $LN_2$ can flow into port 15. This action will self regulate the flow of $LN_2$ to the system. The self regulation elminates the need for complex flow controls which are ordinarily found in prior art heat exchangers.

EXAMPLE

The canister of FIG. 1 was constructed from 4.75 mm alloy 304 stainless steel. Its O.D. was about 25.4 cm and it was about 61 cm long. Tubing 17 was made up of a 15.24 meter length of 9.5 mm copper tubing coiled to an o.d. of about 15 cm. Tubing 18 was about 53 cm long. The $LN_2$ input line was covered with cryogenic line thermal insulation such as ARMAFLEX which is a trademark of the Armstrong Company of Lancaster, Pa. The system could self regulate $LN_2$ at a rate of about 8.5 liters per hour which produced an output of $N_2$ of about 14,158 liters per hour at a temperature above the typical atmospheric dew point. The water flow rate was about 800 liters per hour.

The heat exchanger was used successfully to handle the cryogenic liquid exiting from a Miessner trap used in the operation of a vacuum system. It was also used to handle the $LN_2$ exiting the cold trap or baffle associated with a diffusion pump. In each case the exhaust water from the heat exchanger is connected to a closed loop cooling system return line. Thus, the return water is being sent back to cooling towers cooler than what was sent. This removes a tremendous load from the cooling tower as the water normally returned to the cooling tower would be quite warm.

The invention has been described and an operating system detailed. When a person skilled in the art reads the foregoing description, alternatives and equivalents within the spirit and intent of the invention will be apparent. For example, while $LN_2$ is described, other cryogenic liquids could be employed such as liquid hydrogen, liquid helium, liquid argon, liquid oxygen or liquid natural gas and equivalents. Also, while the canister is described as stainless steel with a copper tubing heat exchange coil, other construction materials could be employed. Accordingly, it is intended that the scope of the invention be limited only by the following claims.

I claim:

1. A self regulating cryogenic liquid evaporator that converts the cryogenic liquid to its gas form at about atmospheric pressure, said evaporator comprising:
   a housing chamber for containing a flow of water at a temperature greatly in excess of the cryogenic temperature;
   a coil of tubing located inside said housing chamber so as to be immersed in said water and connected at one end to the source of cryogenic liquid wherein said water provides the heat necessary to vaporize said cryogenic liquid;
   means for extracting the vaporized cryogenic liquid at the other end of said coil; and
   means for extracting cooled water from the top of said housing chamber whereby the back pressure of said vaporized cryogenic liquid in said coil self regulates the entry of cryogenic liquid into said coil.

2. The evaporator of claim 1 wherein said coil is helical in form and said cryogenic liquid is entered into a vertical tubing section coupled to the bottom thereof.

3. The evaporator of claim 2 wherein said housing chamber is composed of stainless steel and said coil is composed of copper tubing.

4. The evaporator of claim 3 wherein said cryogenic liquid is selected from the group consisting of hydrogen, helium, argon, nitrogen, oxygen and natural gas.

5. The process of self regulating the flow of cryogenic liquid into input port of a heat exchanger, said process comprising the steps:
   providing a heat exchanger having a coil of tubing immersed in a water flow;
   applying said cryogenic liquid to one end of said coil;
   passing a flow of water through said heat exchanger whereby said cryogenic liquid in said coil is vaporized; and
   extracting said vaporized cryogenic liquid from the other end of said coil whereby the back pressure of said vaporized liquid controls the flow of cryogenic liquid into said coil.

6. The process of claim 5 wherein said coil is made helical in form and the flow of water is directed verticlly upward through said coil.

7. The process of claim 6 wherein said coil has its bottom end coupled through a straight tubing section to the input of said cryogenic liquid and said vaporized liquid is extracted from the top end of said coil.

* * * * *